2,790,250

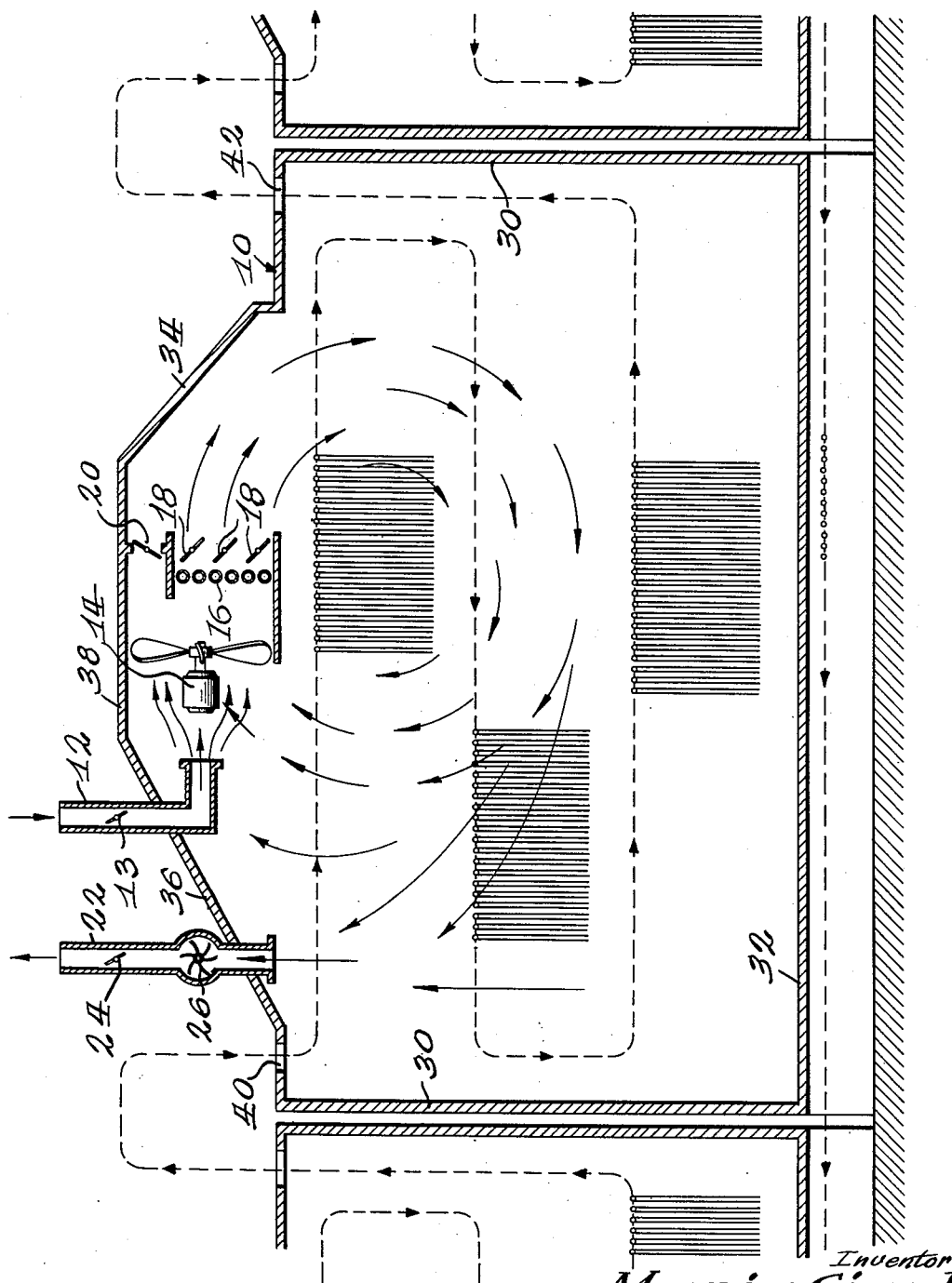

EXTRUDED ALIMENTARY PASTE DRYING APPARATUS

Maurice Giroud, Nanterre, France, assignor to Cereal Food Products Limited, Quebec, Quebec, Canada Application February 8, 1954, Serial No. 408,948

4 Claims. (Cl. 34—207)

The present invention relates to an automatic and continuous process for drying alimentary paste goods of the long extruded type such as macaroni, spaghetti, vermicelli, noodles and other varieties of the same nature and to an apparatus for the carrying out of this drying process.

Prior art

All alimentary pastes which have been extruded through dies to form spaghetti, macaroni, vermicelli, noodles and other varieties of the same nature, contain a relatively high amount of water, more specifically, from about 28% to 32%. This water content must be reduced from about 7% to 13% depending on the variety of product before the finished product can be packaged. This necessary and essential removal of the major portion of the water from the products is a most difficult problem in the alimentary paste industry. This problem does not exist in connection with the drying of the laminated type of alimentary paste dough as well as cut goods, for example, alphabets and/or cut macaroni.

The most difficult problem in the drying process of long alimentary paste is that there is a chemical reaction involved, whereby the protein is converted to gluten which conversion is caused under exothermic conditions.

Further, it is not only necessary to remove the moisture but it is essential in the drying process to remove moisture from the surface of the goods at the same rate as the moisture passes from the interior of the goods to the surface. This equilibrium or balance of moisture removal is known in the trade as "sweating." If the moisture is removed more rapidly from the surface of the goods than it can be replaced by moisture from the interior, the exterior surface of the goods becomes hard and the goods, in the drying, shrink unevenly, setting up stresses which render them brittle and consequently difficult to handle, causing considerable waste.

Prior art attempts to overcome this problem, have resulted in a three-stage drying process in which the first stage consists of a short and fast drying operation which causes a quick surface evaporation. This stage is followed by a long resting period in which the goods are placed in a chamber wherein there is no circulation of air. The final stage is the effective drying stage which is carried out by an intermittent circulation of air at a given temperature and resting periods. The main disadvantage of this process is that, if it is carried out in a single room or chamber, the working area necessarily must be of great dimensions and for equal treatment the goods must be shifted from one portion of the working area to another at frequent intervals, involving considerable time and labour. If the process is carried out mechanically through the use of several units wherein each of which a single step of the process is carried out, again, the units required for this particular use have been constructed, up till now, as being of different shapes and construction, involving the use of complicated mechanical equipment for the transfer of the goods. Furthermore, it is not possible to have access to the goods in any one of the three drying stages before the drying is completed.

As will be appreciated, either of these prior art methods involves a considerable amount of hand labour and considerable amounts of equipment and space for their operation, besides causing considerable waste of goods. Further, they do not lend themselves to increase in production nor the maintenance of high-quality standards.

Applicant's development

The present invention recognizes the problem involved and, as a solution, aims to provide a continuous and automatic process of drying long alimentary paste goods of the extruded type wherein absolute control of temperature and humidity at each stage is made possible. This process is characterized in that the goods are continuously conveyed into an enclosure and while in that enclosure, they are conveyed alternately and in sequence through areas of circulating heated air which constitute respectively, dehydration zones, areas of "dead" or non-circulating air of lesser temperatures than the dehydration zones and constituting resting or sweating zones and, finally, after passing through a last dehydration zone, are conveyed into and through an extended sweating zone and, from said final sweating zone to the exterior of the enclosure. This basic sequence is repeated in as many enclosures and as often as necessary to achieve the required results.

The basic unit or enclosure, of the present apparatus, in accordance with the invention, is made up essentially of a casing, having impervious insulated walls and a closed top and bottom into which the long alimentary paste products are introduced through a suitable opening provided in the top at one end of the unit and are discharged through a corresponding opening in the top of the casing at the other end of the unit. The conveyor means bringing the goods to the casing pass within the casing so that from the time that the long goods are charged in the unit and discharged, they have followed an odd amount of horizontal courses. The reason for the odd amount of courses of passes is to ensure that the final course ends at the opposite end of the casing from the entry of the goods. The preferred arrangement of the casing walls is such that access is provided to any portion of the casing by the operator as required. This is accomplished by having the side walls of the casing disposed in spaced apart relationship from the framework supporting the conveying means so as to have a clear air space therebetween to accommodate the passage of the machine operator. Suitable access doors are provided in the casing walls for this purpose.

A feature of the casing construction resides in the casing top portion which is substantially dome-shaped and is preferably made up of two portions extending obliquely upwards from the end walls and connected to a third substantially flat peak portion disposed substantially parallel to the bottom of the casing.

In the dome portion thus formed in the casing top, an air inlet is provided and a fan is mounted in the casing top so as to blow the majority of the air drawn in through the inlet through a heating unit. The heated air is then blown against one of the oblique portions of the casing top and is thus projected downwards with a circular action through the long goods being conveyed through the upper portion of the casing. This circulation of heated air creates a dehydration zone, whereby part of the humidity at the surface of the long goods is removed. Adjacent to the first, or goods entry opening in the casing, there is provided an air exhaust outlet including a suction fan whereby the hot air which has been blown into the unit and which has now circulated about the goods and consequently contains a certain amount of humidity, is expelled to the outside of the casing.

Due to the particular construction described and particularly to the oblique positioning of the casing top portions, the circulation of the air occurs mainly at the central upper portions of the casing interior, so that the atmosphere adjacent both ends of the unit and the lower portion of the casing interior is substantially dormant, or non-circulating, so that at these portions the relative humidity of the air is practically constant at all times.

As will be understood, during the course followed by the long goods through each casing or unit, they are alternatively submitted to a casing section or dehydrating zone where the surface moisture is partially removed by the circulation of the hot air and, alternatively and in sequence, to sections where, due to the substantial lack of air circulation, a resting or sweating zone is provided wherein the moisture from the centre of the goods is permitted to come to the surface of the goods so as to be consequently removed when the goods again pass through a further moisture removing or dehydrating zone. Finally, the goods are conveyed through the lower portion of the casing constituting the major resting or "dead air" zone and out of the casing. In practice, several casings or units are interconnected so that as the goods leave one casing as described, they are conveyed into the next casing and so on.

In accordance with the invention, at a central point in the unit corresponding to the main dehydrating zone, a hydrostat is provided with connections to the inlet and exhaust elements which automatically controls the air inflow and the air exhaust, thereby ensuring uniform and controlled temperature and humidity conditions within the unit.

*Detailed description*

Having thus generally described the nature of the invention, particular reference will be made to the accompanying drawing wherein there is shown diagrammatically by way of illustration a basic alimentary paste processing unit in accordance with the invention.

In this illustration, the casing 10, is provided with an air inlet 12, through which air is drawn and the majority blown by a fan 14, through a heater 16, which is provided with baffles 18, and a minor portion passing through a by-pass baffle 20; the baffles 18 and 20 serve to regulate the volume of air and its dry temperature which is present at the interior of the unit and controlled by a hydrostat as previously mentioned.

The casing 10, shown diagrammatically, is provided with insulated side walls 30, a bottom 32, and a substantially dome-shaped top. The casing walls 30 are illustrated diagrammatically only in the present illustration but in the preferred construction they are spaced apart from the supporting frame within the casing and the goods conveyors so as to provide a clear airspace along the sides of the unit to accommodate the operator for purposes of supervision if required. Suitable access doors are provided in the casing walls for this purpose. This construction is not illustrated in detail in the present illustration as it will be appreciated that the specific form of construction may be varied without departing from the scope of the invention.

The shape of the casing top portion or dome is important to the functioning of the individual unit in that the top portions 34 and 36 are disposed so as to extend obliquely upwards from the side walls 30, to a connection with a peak portion 38, which is substantially parallel with the bottom 32.

The control of the humidity at the interior of the unit is obtained by means of the air intake 12, which is provided with a controlling damper 13, which serves to control the inflow of fresh air. The damper 13, is controlled by a hydrostat (not illustrated) positioned in the central heating zone of the casing. An exhaust conduit or ventilator 22, is also provided in the top of the casing and a controlling damper 24, also regulated by the hydrostat, regulates the amount of humid air withdrawn by a blower 26.

Due to this arrangement, the volume of air in circulation at any time is constant due to the fact that the amount of humid air which is withdrawn from the unit is automatically compensated by an equivalent intake of fresh air.

The air drawn in through the air intake 12, and through the heater 16, or the by-pass baffle 20, is directed against the casing top portion 34, so as to be deflected downwardly, causing a circulating movement of hot air as substantially indicated by the arrows in the illustration. This mass of hot air constitutes the main drying or dehydrating zones and it is restricted to approximately two-thirds (2/3) of the height of the casing and terminates short of the casing end walls 30 at a distance equal to approximately 1/20 the length of the casing.

The lower casing area and casing end portions are thus rendered areas of substantially "dead" or non-circulating atmosphere which serve as resting or sweating zones. In these zones there is practically no ventilation and the goods are, therefore, rested or sweated to allow the moisture to travel to the surface. The temperature of the zones is constant and is maintained automatically as previously described.

The goods are continuously moved into and through the casing by an endless conveyor system (not illustrated) entering through an opening 40 in the casing top and following an uneven number of horizontal courses through the zones described and finally emerging from the casing top at an outlet opening 42, provided in the other end of the casing. While the number of courses shown are three, it will be appreciated that any uneven number of courses can be utilized, depending on the height of the casing. The first and second horizontal courses shown, carry the goods through the main dehydrating zone and at the end of each course through a resting or sweating zone established at the end of the casing. Finally, the goods are conveyed along the lower course through the main resting zone and vertically upwards out of the casing to the next unit.

As will be appreciated, any number of basic units, as described, can be inter-connected and the goods conveyed from one to the other until the required drying operation has been completed.

By way of an example, an arrangement utilizing five inter-connected units or casings of suitable dimensions for the production of approximately 700 lbs. of dry goods per hour would have the following approximate temperature readings and conveying time per unit. Assuming that the goods have left the press or extruder with a humidity or moisture content of approximately 30%.

| Time in Unit | Humidity Reading | |
|---|---|---|
| | Wet Bulb | Dry Bulb |
| Unit 1—4 to 6 hrs | 90° F | 88° F. |
| Unit 2—4 to 6 hrs | 90° F | 86° F. |
| Unit 3—4 to 6 hrs | 90° F. to 88° F | 83° F. |
| Unit 4—4 to 6 hrs | 87° F. to 85° F | 78° F. |
| Unit 5—4 to 6 hrs | 85° F. to 87° F | 73° F. to 75° F. (approx. room temperature). |

Total time approximately 20 to 30 hours.

As will be appreciated these figures are approximate only but in any case the time for drying should not be reduced for all practical purposes to much less than between 20 and 30 hours. While it is conceivable that the units may be made higher and include more than three horizontal passes or courses this cannot be carried to extremes say for example, beyond 5 or 7 courses without the casings or units becoming too large and consequently presenting additional problems as to air circulation and condensation.

The speed of feeding or conveying the units or casings of course, is regulated by the speed of the press or extruder. If the press stops, the conveyor mechanism will be stopped. In any case the regulation of the humidity is under the control of the hydrostats and therefore the air circulation is maintained even though the conveyor is stopped.

As will be understood by the preceding description and the accompanying illustration, the present invention provides a process and an apparatus for carrying out the process which is simple and efficient in construction. All the units or casings are of identical form so that they can be erected easily and quickly and inter-connected to form an operating assembly of any size desired to suit production flow.

The automatic and continuous conveying of the goods through the units eliminates handling and wastage to the minimum and complete control is provided at every stage to ensure quality standards.

I claim:

1. An apparatus for the drying of long alimentary paste goods of the extruded type comprising, a casing having side walls, a bottom wall and a top wall having portions disposed obliquely relative to said side walls, goods entry and discharge openings at opposite ends of said casing top wall, conveyor means extending into said goods entry opening and through said casing to emerge from said goods discharge opening, the portions of said conveyor within said casing following an uneven number of horizontal courses from adjacent one end of said casing to adjacent the other end of said casing, an air inlet in said casing top wall, blower means adapted to draw air through said inlet and through a heater against said obliquely disposed casing top wall portion, air circulation control means disposed in the path of said heated air co-operating with said casing top wall portion adapted to deflect said air in a controlled circulatory movement within the central portion of said casing, an air discharge outlet and blower means for expelling air through said outlet, and air flow control means in said air inlet and discharge outlet.

2. An apparatus as claimed in claim 1 wherein said conveyor means follows three horizontal courses between entry and exit from said casing.

3. An apparatus for the drying of long alimentary paste goods of the extruded type comprising, a plurality of identical interconnected casings, each having side walls, a bottom wall and a top wall having portions disposed obliquely relative to said side walls, a goods entry and a goods discharge opening at opposite ends respectively of said casing top wall, conveyor means extending into said goods opening of said casing and through said casing to emerge from said goods discharge opening with the portions of said conveyor traveling within said casing following an uneven number of connected horizontal courses from adjacent one end of said casing to adjacent the other end of said casing, an air inlet in said casing top wall, blower means adapted to draw air through said inlet and through a heater and against said obliquely placed casing top wall portion, air circulation control means disposed in the path of said heated air cooperating with said casing top wall portion adapted to deflect said heated air in a controlled circulatory movement within the central portion of said casing, an air discharge outlet and blower means for expelling air through said outlet, and air flow control means in said air inlet and air discharge outlet, said conveyor means extending continuously within and through each of said interconnected casings.

4. An apparatus as claimed in claim 3 wherein said conveyor means follows three horizontal courses between entry and exit from each casing.

References Cited in the file of this patent
UNITED STATES PATENTS

| | | |
|---|---|---|
| 1,445,011 | Fontana | Feb. 13, 1923 |
| 1,495,143 | Allsop et al. | May 27, 1924 |
| 1,523,509 | Braemer | Jan. 20, 1925 |
| 1,734,001 | Allsop et al. | Oct. 29, 1929 |
| 2,504,339 | Mariani | Apr. 18, 1950 |
| 2,732,627 | Fava | Jan. 31, 1956 |